(12) United States Patent
Zhang et al.

(10) Patent No.: US 10,127,641 B2
(45) Date of Patent: Nov. 13, 2018

(54) CONTRAST CONSTRAINED AEROTHERMAL RADIATION CORRECTION METHOD

(71) Applicant: HUAZHONG UNIVERSITY OF SCIENCE AND TECHNOLOGY, Wuhan (CN)

(72) Inventors: Tianxu Zhang, Wuhan (CN); Chuan Zhang, Wuhan (CN); Xuan Hou, Wuhan (CN); Li Liu, Wuhan (CN); Quan Chen, Wuhan (CN); Ao Zhong, Wuhan (CN); Mingxing Xu, Wuhan (CN); Yutian Zhou, Wuhan (CN)

(73) Assignee: HUAZHONG UNIVERSITY OF SCIENCE AND TECHNOLOGY, Wuhan (CN)

(*) Notice: Subject to any disclaimer, the term of this patent is extended or adjusted under 35 U.S.C. 154(b) by 0 days.

(21) Appl. No.: 15/562,887

(22) PCT Filed: Apr. 13, 2016

(86) PCT No.: PCT/CN2016/079129
§ 371 (c)(1),
(2) Date: Sep. 28, 2017

(87) PCT Pub. No.: WO2017/107343
PCT Pub. Date: Jun. 29, 2017

(65) Prior Publication Data
US 2018/0286017 A1    Oct. 4, 2018

(30) Foreign Application Priority Data
Dec. 24, 2015 (CN) .......................... 2015 1 0988503

(51) Int. Cl.
*G06K 9/40* (2006.01)
*G06T 5/00* (2006.01)
(Continued)

(52) U.S. Cl.
CPC ............... *G06T 5/002* (2013.01); *G06T 5/50* (2013.01); *G06T 7/0002* (2013.01);
(Continued)

(58) Field of Classification Search
CPC ......... G06T 5/002; G06T 7/0002; G06T 5/50; G06T 2207/10048; G06T 2207/20024; G06T 2207/20182
(Continued)

(56) References Cited

U.S. PATENT DOCUMENTS

2017/0115160 A1\* 4/2017 Fest ...................... B64C 1/1484

FOREIGN PATENT DOCUMENTS

CN    101261176 A    9/2008
CN    103093425 A    5/2013
(Continued)

*Primary Examiner* — Andrew Moyer
(74) *Attorney, Agent, or Firm* — Matthias Scholl, PC; Matthias Scholl

(57) ABSTRACT

Disclosed in the present invention is a contrast constrained aerothermal radiation correction method. By analyzing features of images at different intensities of aerothermal radiation, it has been discovered that the stronger the aerothermal radiation effect is, the smaller the image contrast becomes, and when thermal radiation correction is performed using a gradient fitting algorithm, it has been discovered that time consumption thereof grows exponentially with an increase in a degree of a fitting surface and with an increase in an image size. The present invention can rapidly and effectively restore an aerothermal radiation image, remarkably improving a signal to noise ratio and quality of the image.

3 Claims, 12 Drawing Sheets

(51) Int. Cl.
*G06T 5/50* (2006.01)
*G06T 7/00* (2017.01)

(52) U.S. Cl.
CPC ............... *G06T 2207/10048* (2013.01); *G06T 2207/20024* (2013.01); *G06T 2207/20182* (2013.01)

(58) Field of Classification Search
USPC ........................................................ 382/260
See application file for complete search history.

(56) References Cited

FOREIGN PATENT DOCUMENTS

| | | | |
|---|---|---|---|
| CN | 105118037 A | 12/2015 | |
| CN | 105160687 A | 12/2015 | |

\* cited by examiner

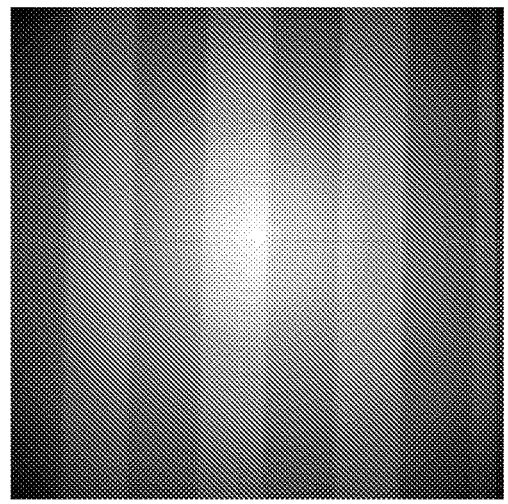
FIG. 8A
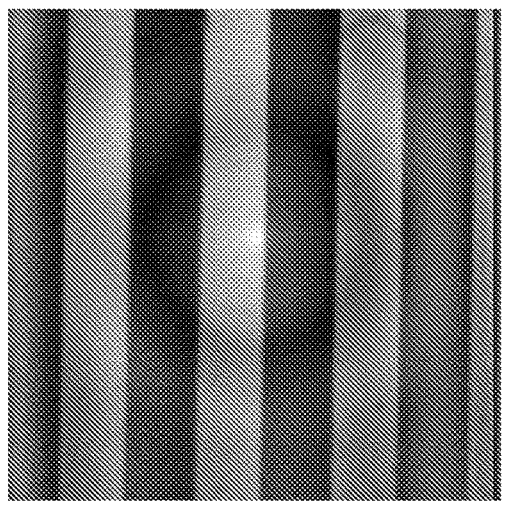 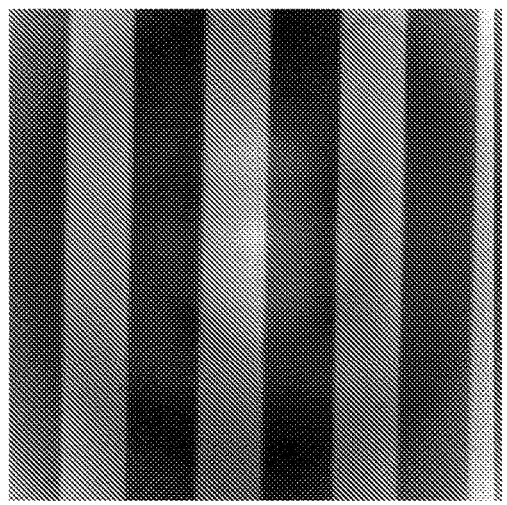
FIG. 8B                FIG. 8C

CONTRAST CONSTRAINED AEROTHERMAL RADIATION CORRECTION METHOD

CROSS-REFERENCE TO RELATED APPLICATIONS

This application is a National Stage Appl. filed under 35 USC 371 of International Patent Application No. PCT/CN2016/079129 with an international filing date of Apr. 13, 2016, designating the United States, and further claims foreign priority benefits to Chinese Patent Application No. 201510988503.9 filed Dec. 24, 2015. Inquiries from the public to applicants or assignees concerning this document or the related applications should be directed to: Matthias Scholl P. C., Attn.: Dr. Matthias Scholl Esq., 245 First Street, 18th Floor, Cambridge, Mass. 02142.

TECHNICAL FIELD

The present disclosure relates to the field of an interdisciplinary science combining aero-optics, information processing and aerospace technology, and more particularly to a contrast-constrained aerothermal radiation correction method which can be applied to image preprocessing for remote sensing, detection, navigation and guidance of high-speed aircraft.

BACKGROUND OF THE INVENTION

Aero-optics is an interdisciplinary science combining aerodynamics and optics. For high-speed aircraft flying in the atmosphere, severe aero-optical effect will occur, which affects the imaging quality of an optical imaging detection system. Therefore, the aero-optical effect, along with its correction method, is an important research direction, and one of the main technical problems that restrict the development and application of high-speed aircrafts.

For high-speed aircraft with an optical imaging detection system flying in the atmosphere, a complex airflow field is formed by the interaction between an optical window and the airflow. Due to air viscosity, the airflow in contact with the surface of the optical window will be retarded, so that the airflow velocity decreases and a boundary layer is formed near the surface of the optical window. Within the boundary layer, the airflow layers with a large velocity gradient will have strong friction, converting kinetic energy of the airflow irreversibly into heat, and leading to rise of the temperature in the wall of the optical window. The high-temperature airflow will continuously transfer heat to the low-temperature walls, causing strong aerothermal heating. The optical window is aerothermal-heated and hence in a severe aerothermal environment; as a result, it produces thermal radiation noise, reduces signal-to-noise ratio and degrades image quality of the optoelectronic detection system.

The greater the flight speed, the more severe the aerothermal heating on the surface of the aircraft. The irradiance of the airflow outside of the optical window and the irradiance of the optical window are superimposed on the irradiance of background; as a result, an imaging sensor will enter a non-linear operation range or saturate, causing loss of effective information of scenes and reduction of signal-to-noise ratio and signal-to-clutter ratio, thus degrading the detection performance. Therefore, it is necessary to perform aerothermal radiation correction on the images acquired by the imaging sensor, in order to improve the image quality. As degradation model of aerothermal radiation is unknown and randomly changed and the degraded images contain other noise, these increase the difficulty of image restoration or correction. In addition, for specific applications in high-speed aircrafts, especially hypersonic aircrafts, the high-frame-rate characteristic of their imaging systems demands that a correction algorithm have extremely high real-time performance.

SUMMARY OF THE INVENTION

In view of the above-described problems, it is one objective of the invention to provide a contrast-constrained aerothermal radiation correction method configured to solve the defects of the conventional aerothermal radiation correction methods, i.e., poor results in handling strong thermal radiation effect and low correction efficiency in processing large-size images; the method provided by the present disclosure can be used for aerothermal radiation correction on images acquired during remote sensing, detection, navigation and guidance of a high-speed aircraft.

To achieve the above objective, in accordance with one embodiment of the invention, there is provided an aerothermal radiation correction method, the method comprising:

(1) filtering out noise and details in an original aerothermal radiation image Z, thus obtaining a filtered image $\hat{Z}$, to overcome the adverse effects of noise in thermal radiation field estimation process;

(2) through estimation of the filtered image $\hat{Z}$, obtaining an aerothermal radiation field $B_1$ of the original aerothermal radiation image Z, and further obtaining an initially corrected image $S_1 = Z - B_1$;

(3) solving a central region of the aerothermal radiation field $B_1$, and according to the central region of the aerothermal radiation field $B_1$, dividing the original aerothermal radiation image Z and the initially corrected image $S_1$ into correspondingly equal-sized image-blocks;

(4) calculating the contrast values of the image-blocks of the original aerothermal radiation image Z and the contrast values of the image-blocks of the initially corrected image $S_1$, respectively, thus obtaining the variation of the contrast values of the image-blocks of the original aerothermal radiation image Z relative to the corresponding image-blocks of the initially corrected image $S_1$;

(5) comparing the variation of the contrast values of the image-blocks corresponding to the central region of radiation and the variation of the contrast values of the image-blocks corresponding to non-central regions of radiation, if the difference is less than or equal to a predetermined threshold value, then taking the initially corrected image $S_1$ as the final correction result, otherwise sequentially proceeding to step (6); and (6) obtaining an image $\hat{Z}_1 = \hat{Z} - B_1$ from the filtered image $\hat{Z}$ and the aerothermal radiation field $B_1$, and taking the portion of the image $\hat{Z}_1$ corresponding to the radiation central region of the aerothermal radiation field $B_1$ as a new filtered image $\hat{Z}$, and through estimation of the new filtered image $\hat{Z}$, obtaining a residual aerothermal radiation field $B_2$ at the radiation central region of the initially corrected image $S_1$, and further obtaining a secondarily corrected image $S_2 = S_1 - B_2$.

In a class of this embodiment, the above method further comprises a step (7) as follows: performing weighted processing to the edges of the radiation central region of the secondarily corrected image $S_2$ and the edges of the radiation central region of the initially corrected image $S_1$, to eliminate the edge effect caused by block division, to achieve higher quality of the images.

In a class of this embodiment, in step (3), taking the radiation central region of the aerothermal radiation field $B_1$ as the center, and dividing the original aerothermal radiation image Z and the initially corrected image $S_1$ into correspondingly equal-sized image-blocks, in such a way that the image-blocks corresponding to the radiation center regions of the aerothermal radiation field $B_1$ and of the original aerothermal radiation image Z are located at the center of all the image-blocks of the original aerothermal radiation image Z, and that the image-blocks corresponding to the radiation center regions of the aerothermal radiation field $B_1$ and of the initially corrected image $S_1$ are located at the center of all the image-blocks of the initially corrected image $S_1$.

In general, the above technical solution contemplated by the present disclosure has the following advantageous effects as compared with the prior art: by analyzing features of aerothermal radiation images with different intensities, it is found that, for an image, the stronger the aerothermal radiation effect, the smaller the contrast. When thermal radiation correction is carried out by using a gradient fitting algorithm, it is found that, the time consumption increases exponentially with the increase of the order of the fitted curved-surface and the image size; the present disclosure can achieve quick and effective aerothermal radiation image restoration, thereby significantly improving signal-to-noise ratio and quality of images.

BRIEF DESCRIPTION OF THE DRAWINGS

FIG. 5A is an original image, FIG. 5B is a filtered image;

FIG. 6A is a reference image; FIG. 6B is an aerothermal-radiation degraded image; FIG. 6C is the result of WLS filtering of FIG. 6B; FIG. 6D is the result of initial correction of FIG. 6B, through gradient fitting of an aerothermal radiation curved-surface, in the case of K=2; FIG. 6E is a schematic diagram illustrating the image-blocks division to the fitted aerothermal radiation field of FIG. 6D in the case of K=2 and the initially corrected result; FIG. 6F is the result of secondary correction of the central region of FIG. 6E; FIG. 6G is the result of edge fusion of FIG. 6E; FIG. 6H is a graph of a column of pixels taken from FIG. 6G, for verification of the result and effect of aerothermal radiation correction;

FIG. 7A is the correction result in the case of K=9; FIG. 7B is the result of contrast-constrained correction; FIG. 7C is graph of a column of pixels taken respectively from a reference image, an unconstrained-corrected image, and a contrast-constrained-corrected image, showing the respective effects; and FIGS. 8A, 8B, 8C, and 8D show the respective effects of electric-arc-wind-tunnel experiments, where, FIG. 8A is an electric-arc-wind-tunnel aerothermal radiation image; FIG. 8B is the result of an unconstrained correction; FIG. 8C is the result of contrast-constrained correction; FIG. 8D is a graph of a column of pixels taken from the respective results, showing the respective effects.

DETAILED DESCRIPTION OF THE EMBODIMENTS

For further illustrating the invention, experiments detailing a contrast-constrained aerothermal radiation correction method are described hereinbelow combined with the drawings. It should be noted that the following examples are intended to describe but not to limit the invention.

Figure 1:
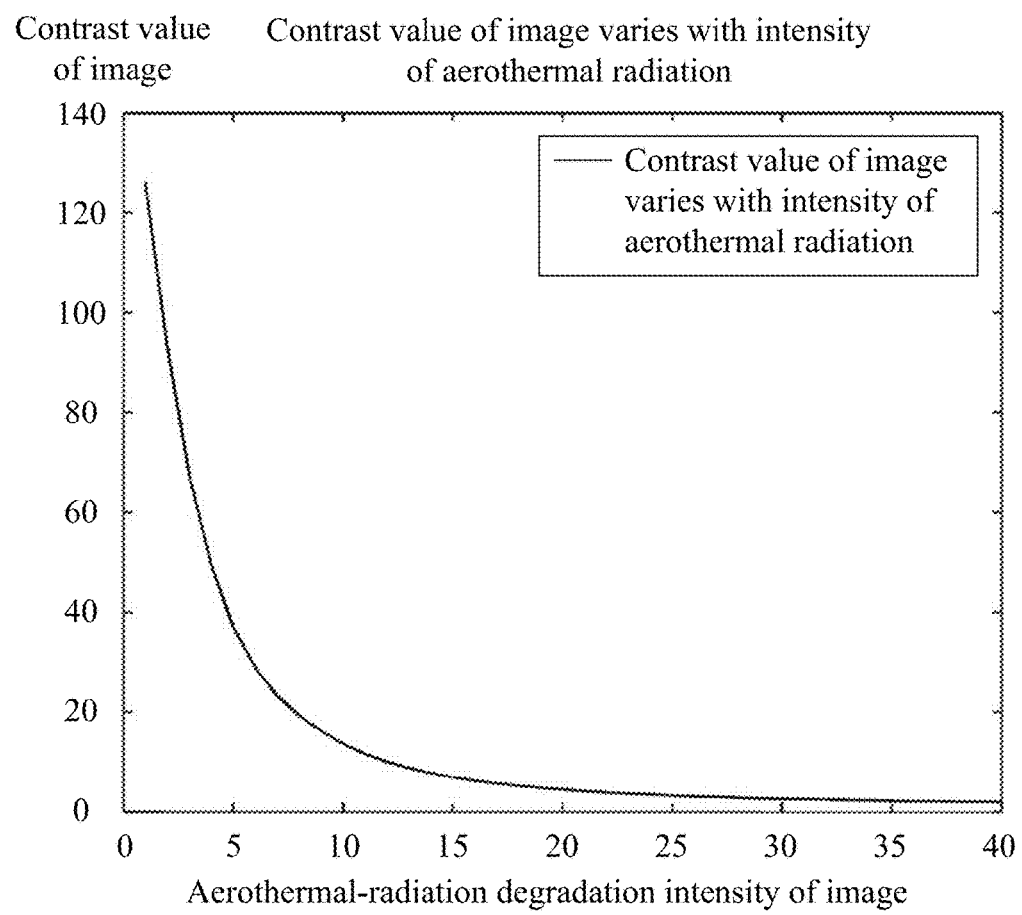
FIG. 1 is a graph showing image contrast value varies with intensity of aerothermal radiation, by adding a curved-surface with gradually-increased irradiance to an input image and calculating variance of contrast values.
Figure 2:
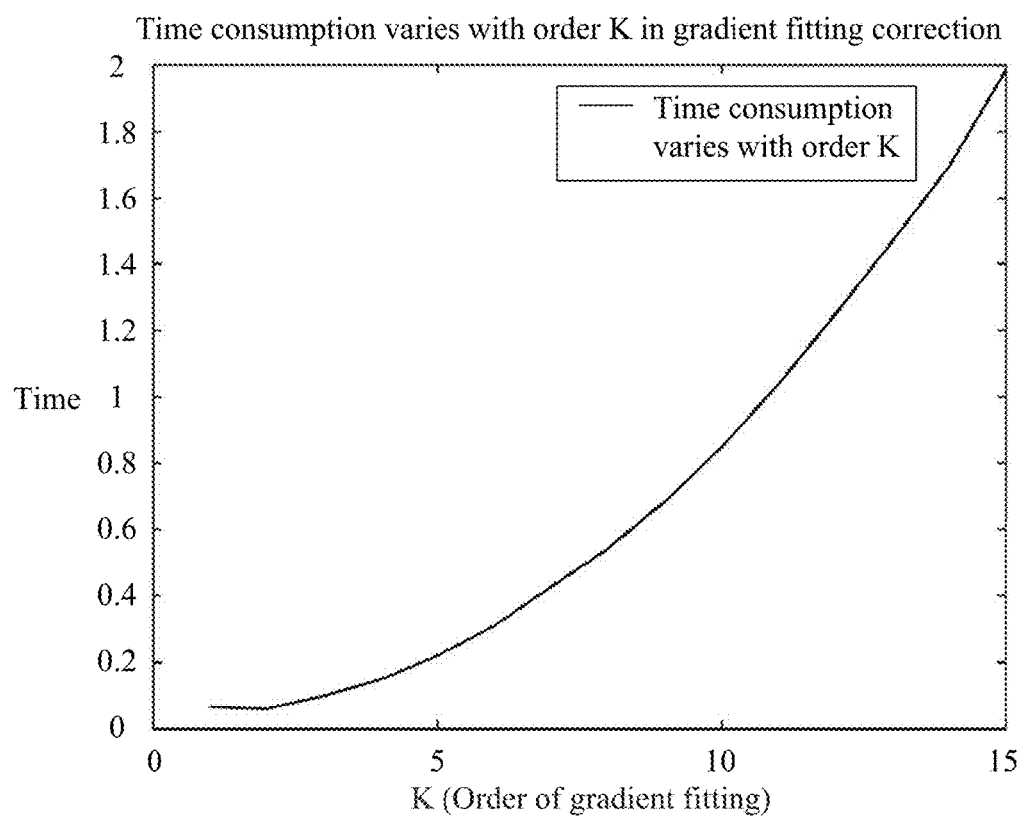
FIG. 2 is a graph showing time consumption varies with fitting order K, in a correction method of gradient least-squares fitting.
Figure 3:
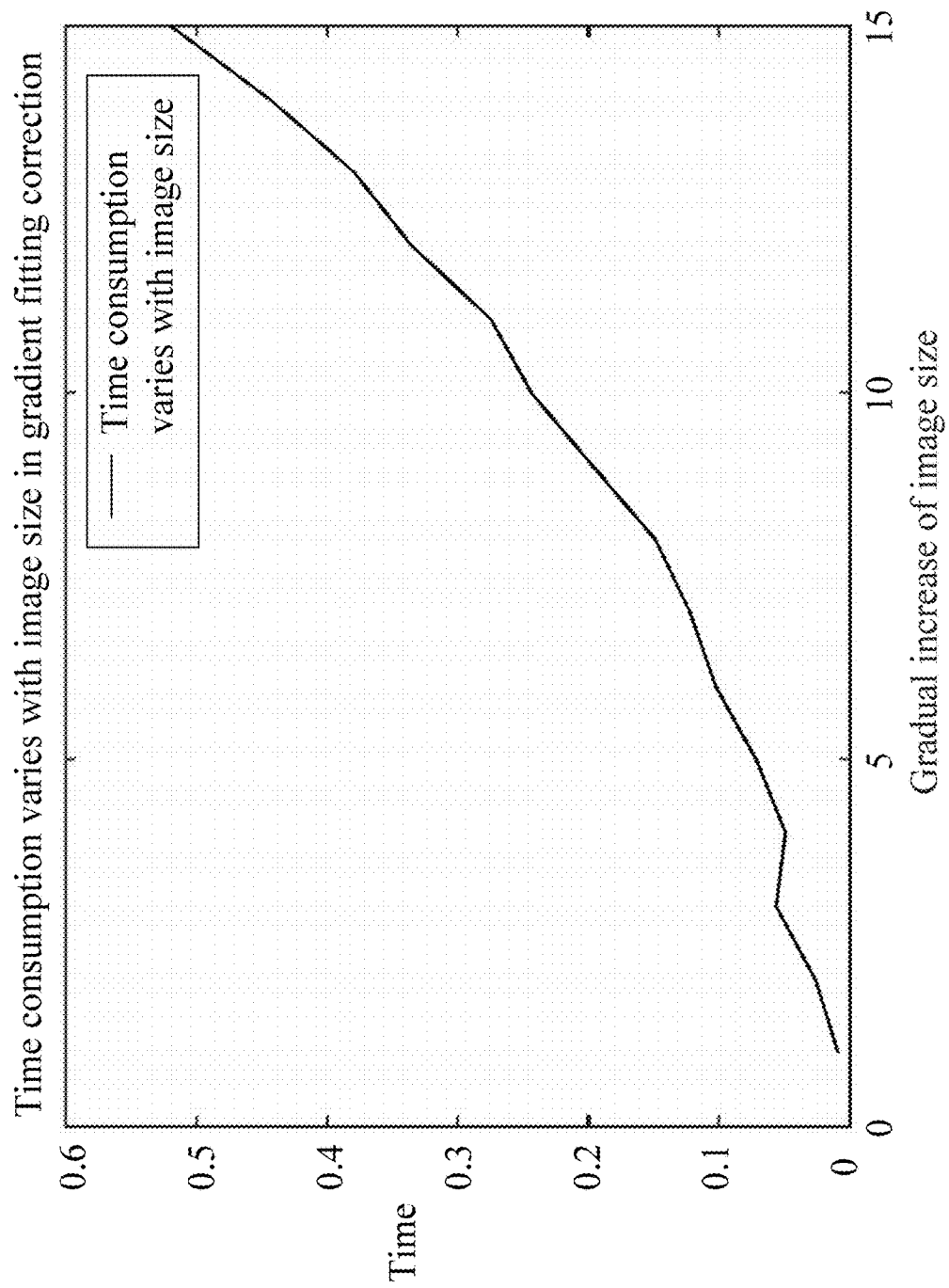
FIG. 3 is a graph showing time consumption varies with image size, in a correction method of gradient least-squares fitting.

The present disclosure is based on the following three characteristics of thermal radiation correction: (1) image contrast value decreases with gradual increase of aerothermal radiation intensity, as shown in FIG. 1; (2) when thermal radiation correction is carried out by using gradient fitting, the time consumption increases exponentially with increase of fitting order K, as shown in FIG. 2; (3) when thermal radiation correction is carried out by using gradient fitting, the correction time consumption increases approximately in exponential form with increase of image size, as shown in FIG. 3; therefore, a contrast-constrained aerothermal radiation correction method is proposed.

Figure 4:
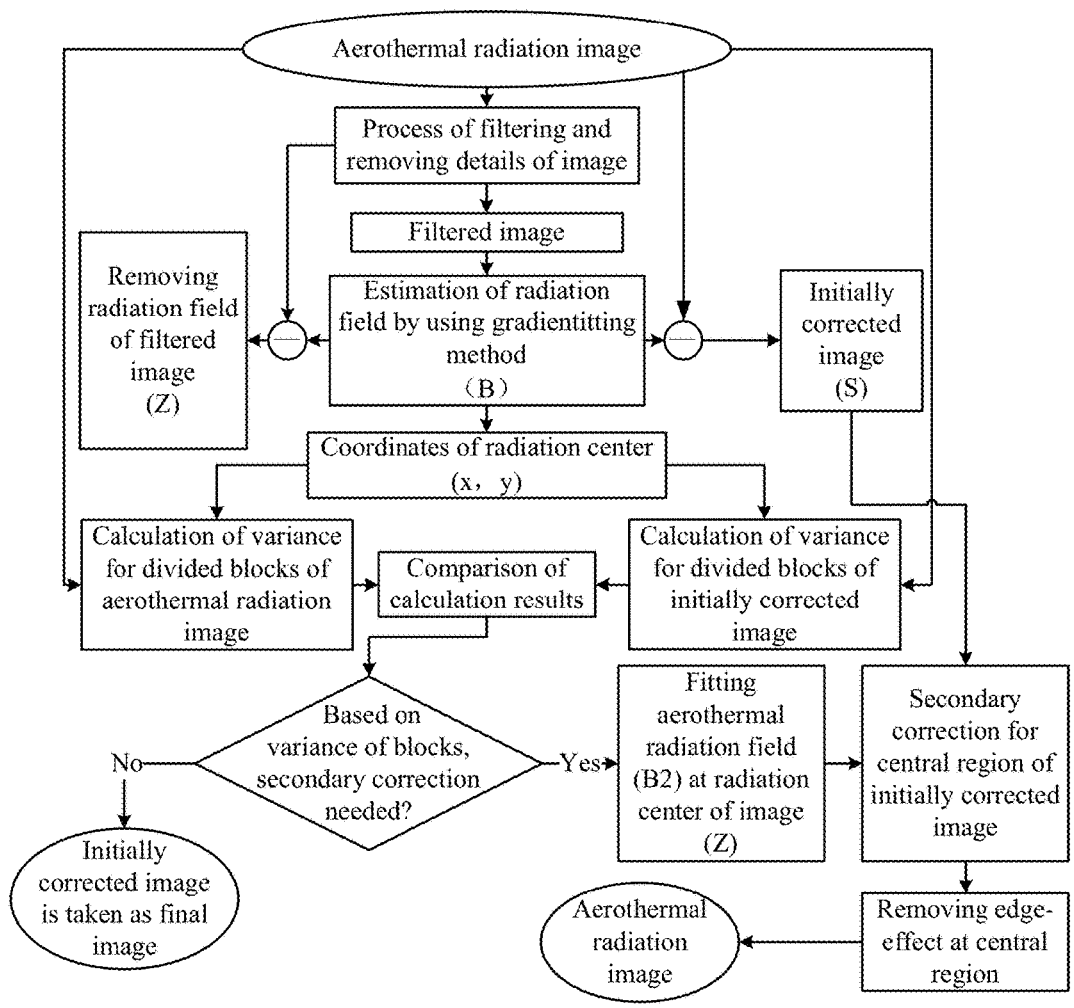
FIG. 4 is a flowchart of the contrast-constrained aerothermal radiation correction method according to an embodiment of the present disclosure.

As shown in FIG. 4, the contrast-constrained aerothermal radiation correction method according to an embodiment of the present disclosure comprises the following steps:

(1) Due to the low-frequency characteristics of an aerothermal radiation field, using an image-smoothing algorithm based on WLS to filter out noise and details in an original aerothermal radiation image Z, thus obtaining a filtered image $\hat{Z}$, to overcome the adverse effects of noise in thermal radiation field estimation process;

Specifically, the filtered image $\hat{Z}$ is expressed as:

$$\hat{Z}=(I+\lambda L)^{-1}Z,$$

where, I is a unit matrix; $\lambda$ is a smooth parameter, the larger $\lambda$, the smoother the filtered image, and in this embodiment, it is set to 0.002; $L=D_x^T W_x D_x + D_y^T W_y D_y$, $D_x$ and $D_y$ are forward difference operators in x direction and y direction of the image coordinate system, respectively; $W_x$ and $W_y$ are weighting-factor diagonal matrixes in x direction and y direction of the image coordinate system, respectively.

Specifically, the value of the diagonal element in the i-th row of $W_x$ is $$\left(\left|\frac{\partial l}{\partial x}(i)\right|^\alpha + \varepsilon\right)^{-1},$$

the value of the diagonal element in the i-th row of $W_y$ is $$\left(\left|\frac{\partial l}{\partial y}(i)\right|^\alpha + \varepsilon\right)^{-1},$$

where, l is the logarithmic transformation of an input image Z;

$$\frac{\partial l}{\partial x}$$

and $$\frac{\partial l}{\partial y}$$

represent gradients in x direction and y direction, respectively; α is a constant for control of a filter's sensitivity to the gradient of an original image, the larger α, the more sensitive to the gradient of the original image, and the stronger edge-retention of the image after filtering, and in this embodiment, it is set to 1.1; ε is a relatively small constant for preventing denominator from being 0, and in this embodiment, it is set to 0.00001.

Figure 5A:
FIGS. 5A and 5B show the filtering effect of weighted least-squares (WLS), where.
Figure 5B:

FIGS. 5A and 5B show the WLS filtering effect, where, FIG. 5A is an original image, FIG. 5B is a filtered image; it is apparent from the figure, after the WLS filtering processing, most of the details of the image are filtered out.

Figure 6A:
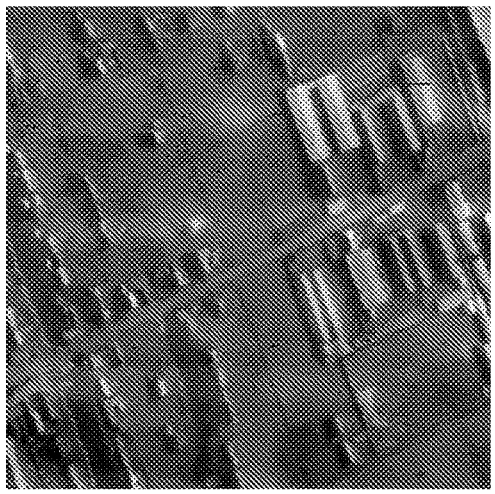
FIGS. 6A, 6B, 6C, 6D, 6E, 6F, 6G, and 6H show an example of the contrast-constrained aerothermal radiation correction method, where.
Figure 6B:
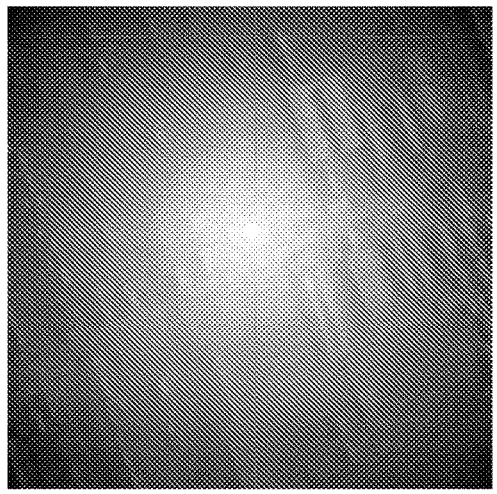
Figure 6C:
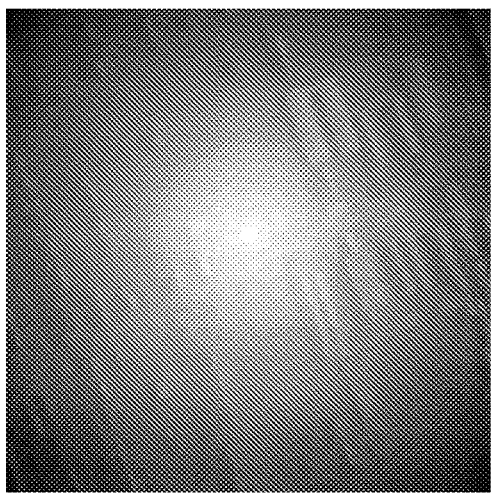

Based on this feature of WLS, the filtering process is performed on aerothermal-radiation degraded images; FIG. 6A is an original infrared image, FIG. 6B is an aerothermal-radiation degraded image; FIG. 6C is the image after the WLS filtering processing, from which high-frequency components (noise and details) are filtered out, making estimation of a low-frequency aerothermal radiation field in subsequent steps more accurate.

(2) Based on the feature that an aerothermal radiation field B can be fitted by a K-order two-dimensional polynomial, using a least-squares method for estimation of the filtered image $\hat{Z}$, thus obtaining the aerothermal radiation field B of the original aerothermal radiation image Z; in this step, the aerothermal radiation field obtained through estimation with the setting K=2 is denoted as $B_1$, and in the subsequent step (6), the initially corrected residual aerothermal radiation field obtained through estimation is denoted as $B_2$.

Further, from the obtained aerothermal radiation field $B_1$, an initial corrected image $S_1=Z-B_1$ is obtained;

$$B(x,y) = \sum_{t=0}^{K}\sum_{s=0}^{K-t} a_{t,s} x^t y^s = Ca$$

where, (x, y) are coordinates of a pixel; a is polynomial coefficient; C is a constant matrix for substituting x and y into the above equation; K is the order of the two-dimensional polynomial.

$$\operatorname{argmin} \|\nabla \hat{Z} - \nabla B\|_2^2$$

A least-squares method is employed for estimation, and when the L2 norm of the difference between the gradient $\nabla \hat{Z}$ of the filtered image $\hat{Z}$ and the gradient $\nabla B$ of the aerothermal radiation field to be estimated arrives at a minimum solution, that is the solved aerothermal radiation field B, as shown by the above formula.

Figure 6D:
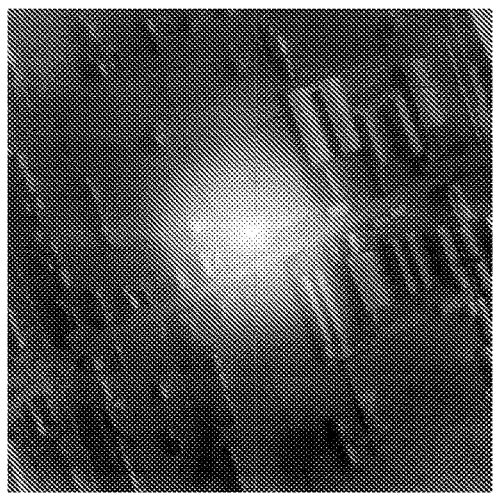

In the solving process of this approach, the time consumption has the trend of exponential growth with the increase of K, as shown in FIG. 2; therefore, in the first use of the above approach, the aerothermal radiation field $B_1$ is solved with the setting K=2, thus obtaining the initial corrected image $S_1$, as shown in FIG. 6D, and by subtracting the radiation field $B_1$ from the filtered image, an image $\hat{Z}_1$ is obtained, $\hat{Z}_1$ is used as a filtered image and as an input image in subsequent steps for secondary estimation of radiation field. It can be seen from the initially corrected image that, most of the radiation field of the image has been filtered out, and only the radiation central region remains relatively strong radiation field; therefore, the subsequent steps focus on estimation and removal of the thermal radiation field at the radiation central region.

Figure 6E:
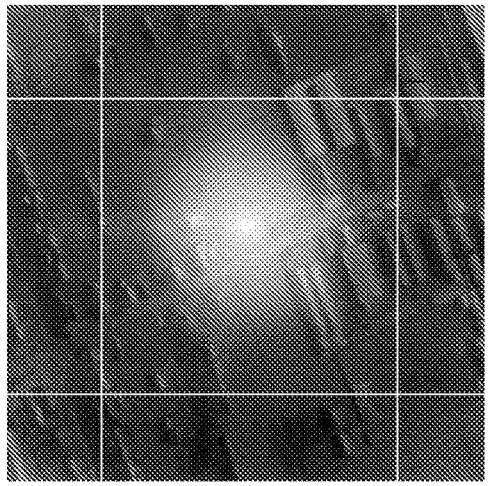

(3) Solving the radiation central region of the aerothermal radiation field $B_1$, wherein the radiation central region corresponds to the region having relatively large gray-scale values in the thermal radiation image; and according to the radiation central region of the aerothermal radiation field $B_1$, dividing the original aerothermal radiation image Z and the initially corrected image $S_1$ into correspondingly equal-sized image-blocks;

For example, by utilizing the solved radiation central region, block-division processing is performed on the input aerothermal radiation image (as shown in FIG. 6B) and the initially corrected image (as shown in FIG. 6D), thus, with the radiation central region as the center, the images are each divided into 9 image-blocks, and the result is as shown in FIG. 6E.

(4) Calculating the contrast values of the image-blocks of the original aerothermal radiation image Z and the contrast values of the image-blocks of the initially corrected image $S_1$, respectively, thus obtaining the variation of the contrast values of the image-blocks of the original aerothermal radiation image Z relative to the corresponding image-blocks of the initially corrected image $S_1$;

For example, a method for calculating the contrast value of an image-block is as follows:

Calculating the sum of the squares of the difference between the gray-scale value of each pixel and the gray-scale values of the four adjacent pixels, then dividing the sum by the total pixel number of the image block.

$$Ctr = \Sigma_\delta \delta(i,j)^2 P_\delta(i,j)$$

where, δ(i, j) is the gray-scale difference between adjacent pixels; $P_\delta(i, j)$ is the distribution probability of a pixel with gray-scale difference between adjacent pixels being δ; Ctr is the contrast value of the image.

With the above contrast-value calculation formula, the contrast values of the image-blocks of the original aerothermal radiation image Z and the contrast values of the image-blocks of the initially corrected image $S_1$ are calculated respectively, as shown in Table 1 and Table 2. Table 1 shows the contrast values of the respective image-blocks of the original aerothermal radiation image Z, Table 2 shows the contrast values of the respective image-blocks of the initially corrected image $S_1$, and Table 3 shows the difference between the contrast values of the corresponding image-blocks of both the original aerothermal radiation image Z and the initially corrected image $S_1$.

TABLE 1

| | | |
|---|---|---|
| 41.5 | 26.7 | 83.2 |
| 43.7 | 18.0 | 70.3 |
| 100.3 | 37.1 | 22.8 |

TABLE 2

| | | |
|---|---|---|
| 126.0 | 169.8 | 337.4 |
| 220.9 | 44.6 | 271.5 |
| 237.3 | 126.2 | 103.8 |

TABLE 3

| | | |
|---|---|---|
| 84.4 | 143.1 | 254.2 |
| 177.1 | 26.5 | 201.1 |
| 137.0 | 89.1 | 80.9 |

(5) Based on the feature that, for an aerothermal radiation image, the stronger the radiation, the smaller the contrast, comparing and analyzing the variation of the contrast values of the image-blocks of the original aerothermal radiation image Z relative to the corresponding image-blocks of the initially corrected image $S_1$, which is obtained in step (4); if the variation of the contrast values at the central region of radiation is significantly less than the variation of the contrast values at non-central regions of radiation, that is, the difference is greater than a predetermined threshold value T, which indicates that: the radiation intensity of the original aerothermal radiation image Z is quite high, although the effect of correction for non-central regions of radiation has reached to a relatively high level, the central region of radiation still remains relatively strong aerothermal radiation noise, hence, it is necessary to perform secondary correction to the central region of radiation, thus sequentially proceeding to step (6);

Contrarily, if the variation of the contrast values at the central region of radiation is slightly different from the variation of the contrast values at non-central regions of radiation, that is, the difference is less than or equal to a predetermined threshold value T, which indicates that: the radiation intensity of the original aerothermal radiation image Z is relatively low, so the image has been well corrected, thus taking the initially corrected image $S_1$ as the final correction result;

It can be clearly seen from Table 3 that, the restoration of the contrast value at the central region of radiation is significantly lower than that at the peripheral regions, which indicates that the central region of radiation still remains relatively strong aerothermal radiation noise, so it is necessary to perform secondary correction to the central region of radiation.

(6) Obtaining an image $\tilde{Z}_1 = \hat{Z} - B_1$ from the filtered image $\hat{Z}$ resulted in step (1) and the aerothermal radiation field $B_1$ resulted in step (2), and taking the portion of the image $\tilde{Z}_1$ corresponding to the radiation central region of the aerothermal radiation field $B_1$ as a new filtered image $\hat{Z}$, and through estimation of the new filtered image $\hat{Z}$, obtaining a residual aerothermal radiation field $B_2$ at the radiation central region of the initially corrected image $S_1$, and further obtaining a secondarily corrected image $S_2 = S_1 - B_2$;

In the fitting process herein, since only the relatively small region at the center of the image is subjected to the fitting process, it is possible to use a higher order K—compared with the case in step (2)—for the fitting process, without causing a high cost of time consumption; in this embodiment, K=5. By subtracting the estimated aerothermal radiation field at the central region from the central region of the initially corrected image, a secondary corrected image $S_2$ is obtained, as shown in FIG. 6F.

(7) Due to the edge effect inevitably brought by block division processing of images, in this step, performing weighted processing to the edges of the radiation central region of the secondarily corrected image $S_2$ and the edges of the radiation central region of the initially corrected image $S_1$, to eliminate the edge effect caused by block division, to achieve higher quality of the images.

Figure 6F:
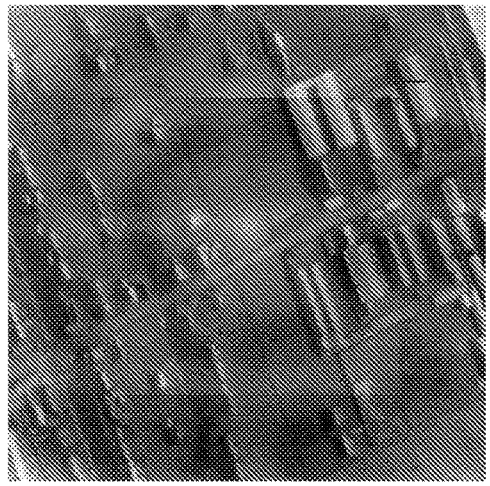
Figure 6G:
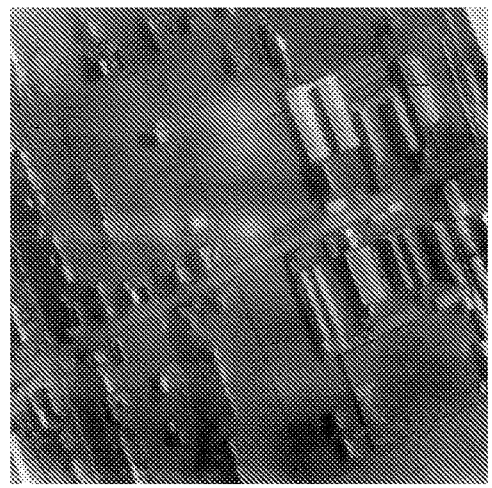
Figure 6H:
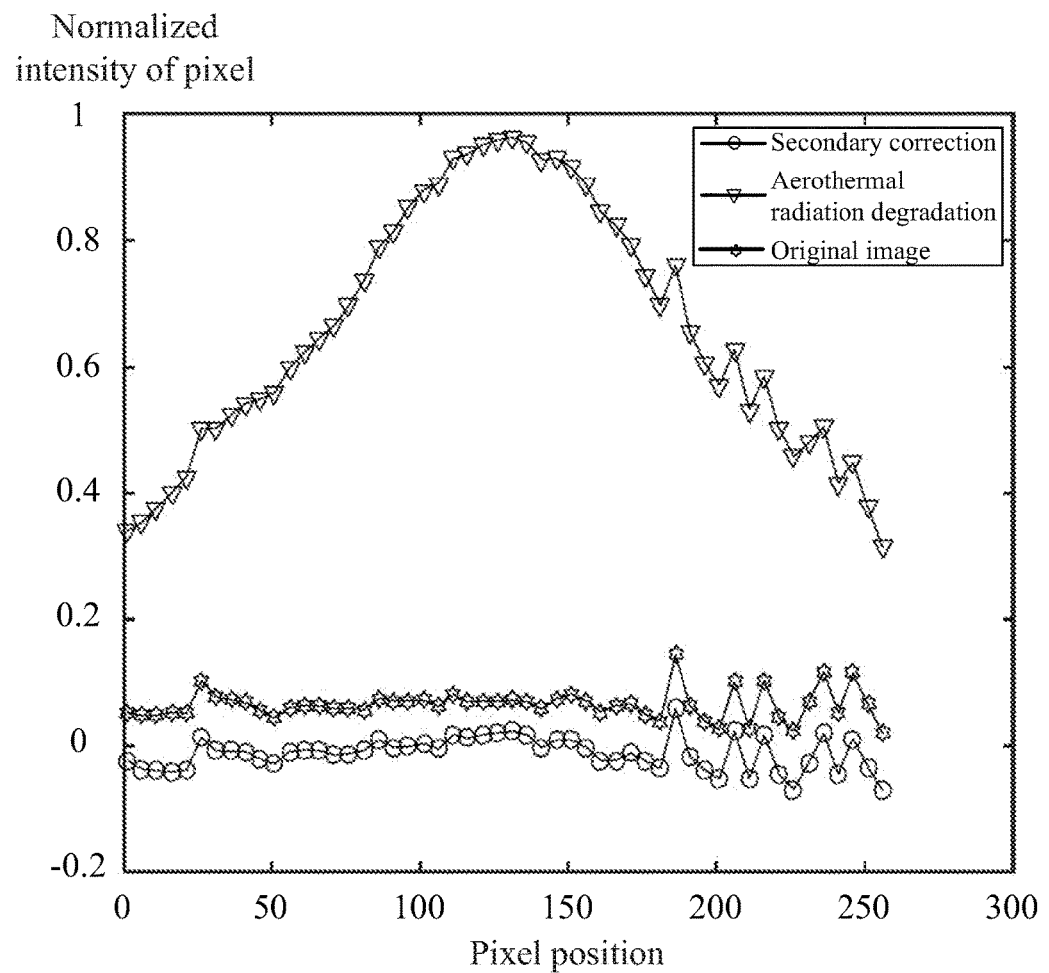

It can be seen from FIG. 6F that, the aerothermal radiation noise has been completely removed, but the edge effect brought by block division still remains; the image after weighted processing is as shown in FIG. 6G. FIG. 6H shows a graph of a column of pixels taken from the original image, the aerothermal radiation image and the contrast-constrainted corrected image, respectively, and it can be seen from the graph that, after processing according to the method of the present disclosure, the aerothermal radiation effect in the image has been well corrected.

Figure 7A:
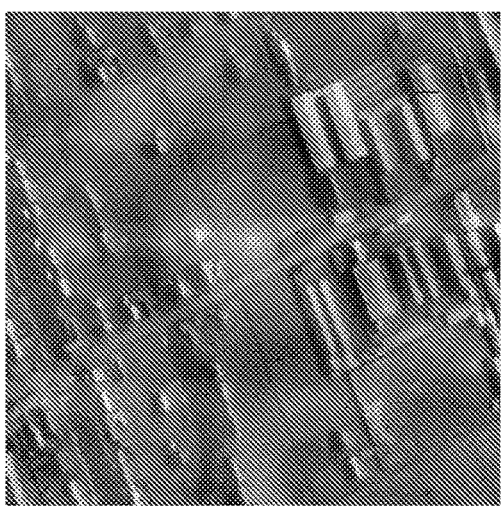
FIGS. 7A, 7B, and 7C show comparison of the contrast-constrained aerothermal radiation correction method and a unconstrained aerothermal radiation correction method, where.
Figure 7B:
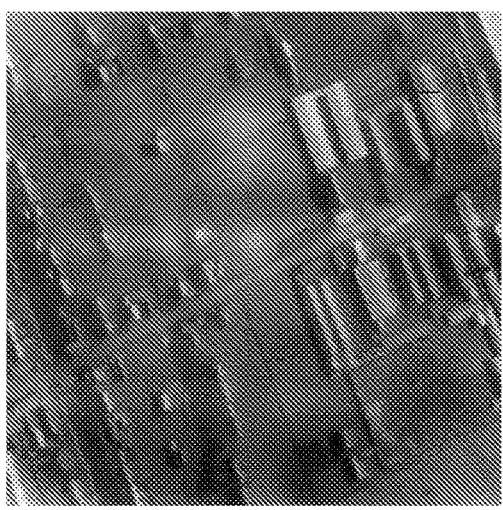
Figure 7C:
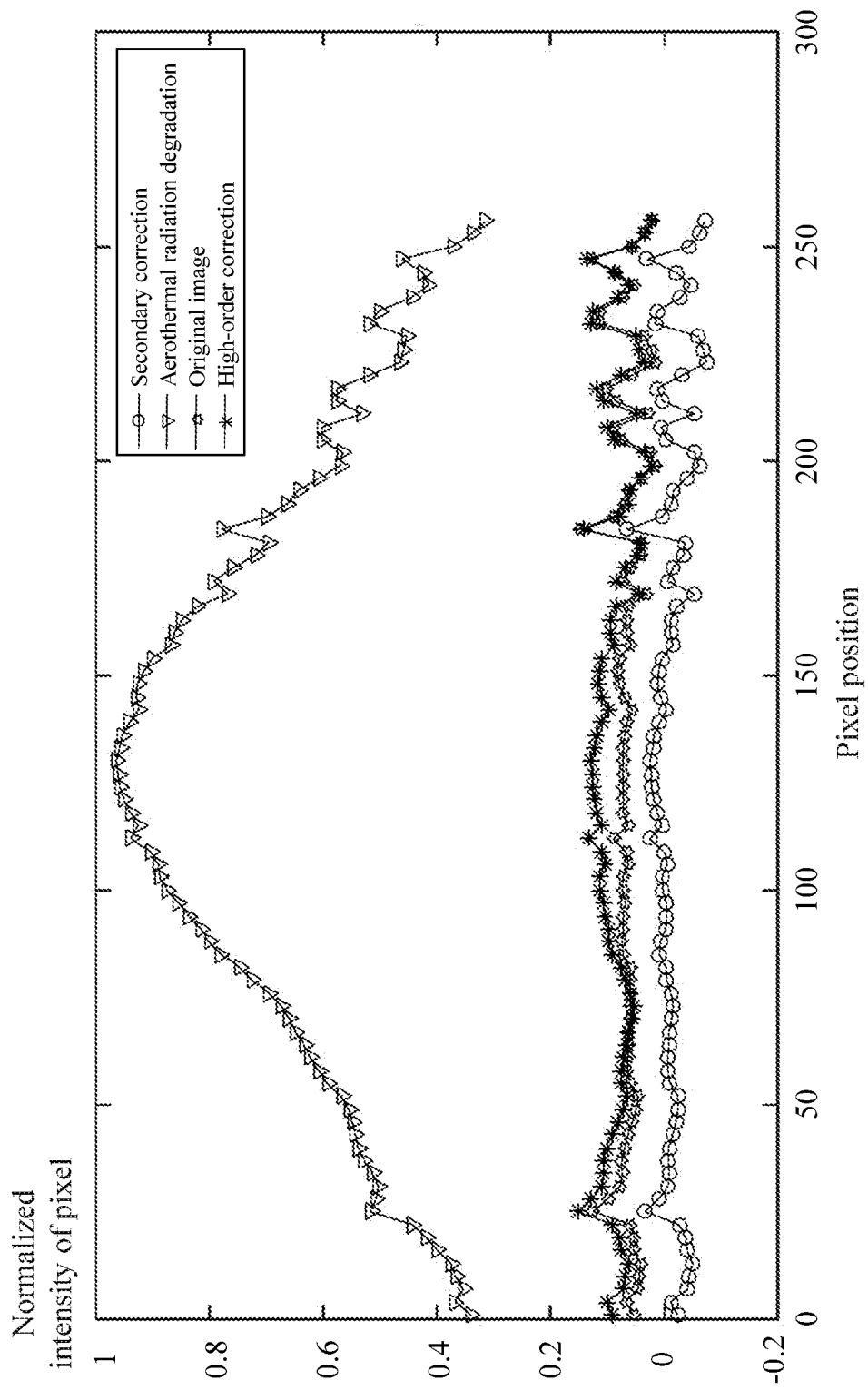

FIGS. 7A, 7B, and 7C show the result of aerothermal-radiation-field gradient fitting by directly using K=9 (FIG. 7A) and the result of contrast-constrained secondary correction (FIG. 7B); it is apparent from the figure that, directly using high-order fitting leads to generation of a relatively strong halation ring at the central region of aerothermal radiation, thus affecting image quality, whereas contrast-constrained secondary correction overcomes this problem; FIG. 7C is a graph of a column of pixels taken from an original image, an aerothermal radiation image, a corrected image by using high-order (K=9) two-dimensional polynomial fitting and a contrast-constrained-corrected image, respectively, showing that the method of the present disclosure reduces correction time consumption while guaranteeing correction effect.

Below, Table 4 shows comparison of the respective parameters, such as time consumption and PSNR (peak-signal-to-noise ratio), of a direct correction method and the contrast-constrained correction method in correction of the same aerothermal radiation image, and it can be clearly seen from the table that, the contrast-constrained correction method greatly reduces correction time consumption, with slightly increase of PSNR.

TABLE 4

| Images | T(s) | PSNR(dB) |
|---|---|---|
| Aerothermal radiation image | — | 12.34 |
| Directly corrected image | 0.7393 | 19.23 |
| Contrast-constrained-corrected image | 0.4322 | 22.85 |

Figure 8D:
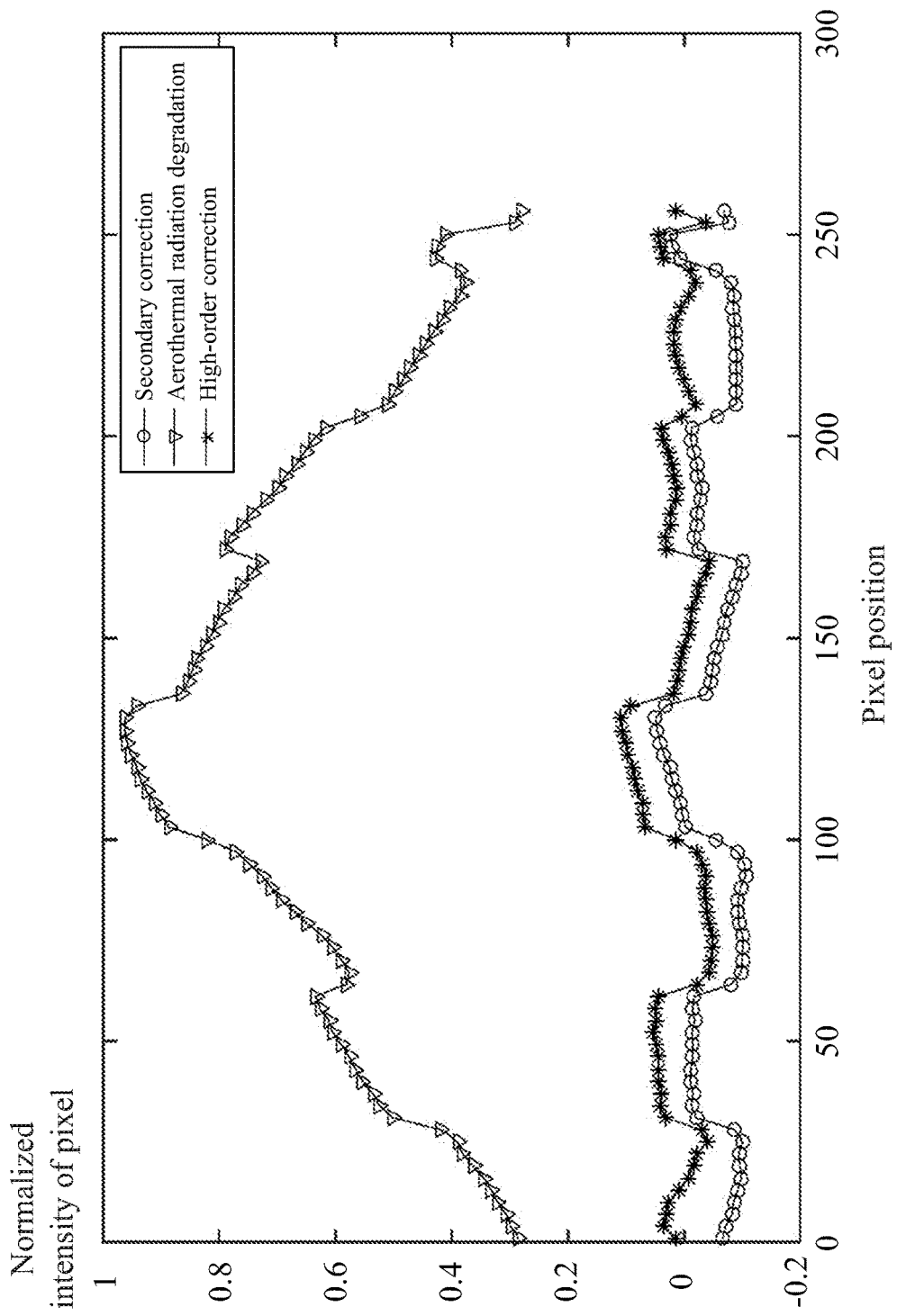

FIGS. 8A, 8B, 8C, and 8D are an example for correcting an electric-arc-wind-tunnel image, where, FIG. 8A is a wind-tunnel aerothermal radiation image, FIG. 8B is the corrected image by using high-order (K=9) two-dimensional polynomial fitting, FIG. 8C is the contrast-constrained-corrected image, FIG. 8D is a graph of a column of pixels taken from the electric-arc-wind-tunnel aerothermal radiation image, the corrected image by using high-order (K=9) two-dimensional polynomial fitting and the contrast-constrained-corrected image, respectively.

Unless otherwise indicated, the numerical ranges involved in the invention include the end values. While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:
1. An aerothermal radiation correction method, the method comprising:
(1) filtering out noise and details in an original aerothermal radiation image Z, thus obtaining a filtered image $\hat{Z}$, to overcome the adverse effects of noise in thermal radiation field estimation process;
(2) through estimation of the filtered image $\hat{Z}$, obtaining an aerothermal radiation field $B_1$ of the original aero- thermal radiation image Z, and further obtaining an initially corrected image $S_1=Z-B_1$;

(3) solving a central region of the aerothermal radiation field $B_1$, and according to the central region of the aerothermal radiation field $B_1$, dividing the original aerothermal radiation image Z and the initially corrected image $S_1$ into correspondingly equal-sized image-blocks;

(4) calculating the contrast values of the image-blocks of the original aerothermal radiation image Z and the contrast values of the image-blocks of the initially corrected image $S_1$, respectively, thus obtaining the variation of the contrast values of the image-blocks of the original aerothermal radiation image Z relative to the corresponding image-blocks of the initially corrected image $S_1$;

(5) comparing the variation of the contrast values of the image-blocks corresponding to the central region of radiation and the variation of the contrast values of the image-blocks corresponding to non-central regions of radiation, if the difference is less than or equal to a predetermined threshold value, then taking the initially corrected image $S_1$ as the final correction result, otherwise sequentially proceeding to step (6); and (6) obtaining an image $\tilde{Z}_1=\hat{Z}-B_1$ from the filtered image $\hat{Z}$ and the aerothermal radiation field $B_1$, and taking the portion of the image $\tilde{Z}_1$ corresponding to the radiation central region of the aerothermal radiation field $B_1$ as a new filtered image $\hat{Z}$, and through estimation of the new filtered image $\hat{Z}$, obtaining a residual aerothermal radiation field $B_2$ at the radiation central region of the initially corrected image $S_1$, and further obtaining a secondarily corrected image $S_2=S_1-B_2$.

2. The method of claim 1, further comprising a step (7) as follows: performing weighted processing to the edges of the radiation central region of the secondarily corrected image $S_2$ and the edges of the radiation central region of the initially corrected image $S_1$, to eliminate the edge effect caused by block division, to achieve higher quality of the images.

3. The method of claim 1 or 2, wherein in step (3), taking the radiation central region of the aerothermal radiation field $B_1$ as the center, and dividing the original aerothermal radiation image Z and the initially corrected image $S_1$ into correspondingly equal-sized image-blocks, in such a way that the image-blocks corresponding to the radiation center regions of the aerothermal radiation field $B_1$ and of the original aerothermal radiation image Z are located at the center of all the image-blocks of the original aerothermal radiation image Z, and that the image-blocks corresponding to the radiation center regions of the aerothermal radiation field $B_1$ and of the initially corrected image $S_1$ are located at the center of all the image-blocks of the initially corrected image $S_1$.

* * * * *